US012375457B2

United States Patent
Elsner (10) Patent No.: US 12,375,457 B2
(45) Date of Patent: Jul. 29, 2025

(54) INTEGRATED INSTANT MESSAGING SYSTEM WITH BUILT IN TRANSLATION AND METHOD THEREOF

(71) Applicant: Mert Can Elsner, Berlin (DE)

(72) Inventor: Mert Can Elsner, Berlin (DE)

(73) Assignee: Mert Elsner, Berlin (DE)

( * ) Notice: Subject to any disclaimer, the term of this patent is extended or adjusted under 35 U.S.C. 154(b) by 132 days.

(21) Appl. No.: 18/116,825

(22) Filed: Mar. 2, 2023

(65) Prior Publication Data
US 2024/0297870 A1  Sep. 5, 2024

(51) Int. Cl.
*H04L 9/40* (2022.01)
*H04L 51/04* (2022.01)
*H04L 51/063* (2022.01)
*H04L 51/216* (2022.01)

(52) U.S. Cl.
CPC .......... *H04L 63/0428* (2013.01); *H04L 51/04* (2013.01); *H04L 51/063* (2013.01); *H04L 51/216* (2022.05)

(58) Field of Classification Search
CPC ............. H04L 63/0428; H04L 63/0435; H04L 63/0442; H04L 51/216; H04L 51/04; H04L 51/063; H04L 51/4625; H04L 12/46; H04L 12/4625
USPC ........................................................ 713/170
See application file for complete search history.

(56) References Cited

U.S. PATENT DOCUMENTS

| 8,140,322 B2* | 3/2012 | Simonsen | G06F 40/58 704/7 |
| 10,657,333 B2* | 5/2020 | Leydon | H04L 51/04 |
| 11,328,131 B2* | 5/2022 | Orlick | G10L 15/26 |
| 11,475,875 B2* | 10/2022 | Chakravarthy | G10L 15/22 |
| 11,956,352 B2* | 4/2024 | Taylor | H04L 9/12 |
| 2009/0274299 A1* | 11/2009 | Caskey | H04L 63/104 380/255 |
| 2013/0066987 A1* | 3/2013 | Levinson | G06Q 10/10 709/206 |
| 2014/0303960 A1* | 10/2014 | Orsini | G06Q 30/0217 704/2 |
| 2014/0337989 A1* | 11/2014 | Orsini | H04L 51/212 726/26 |
| 2015/0326514 A1* | 11/2015 | Liberty | H04L 51/046 709/206 |

(Continued)

FOREIGN PATENT DOCUMENTS

| WO | WO-2018234732 A1 * | 12/2018 | G06F 17/289 |
| WO | WO-2020198799 A1 * | 10/2020 | G06F 16/3337 |

*Primary Examiner* — Sargon N Nano
(74) *Attorney, Agent, or Firm* — NZ Carr Law Office (57) ABSTRACT

An integrated instant messaging system (100) with an inbuilt translation feature and method for translating a plurality of messages in a respective language of a chat participants by sending a public key by a server (110) to the chat participant for facilitating interaction between the chat participants on a messaging application (150), automatically encrypting, by the public key, the messages of the chat participants; decrypting, by the server (110), the messages of the chat participants, automatically translating, by translation engine (105), the messages to a recipient respective language in real time, sending, and automatically decrypting encrypted translated message by the user device (130), to display the plurality of messages in the respective language on the display interface (145) of the user device (130).

17 Claims, 9 Drawing Sheets

(56) References Cited

U.S. PATENT DOCUMENTS

| | | | |
|---|---|---|---|
| 2017/0199870 A1* | 7/2017 | Zheng | G06F 40/263 |
| 2018/0165276 A1* | 6/2018 | Yoo | G06F 40/51 |
| 2018/0293231 A1* | 10/2018 | Tamilchelvan | G06F 40/226 |
| 2018/0367477 A1* | 12/2018 | Hariram | H04L 51/046 |
| 2021/0312824 A1* | 10/2021 | Song | G09B 5/04 |
| 2022/0199087 A1* | 6/2022 | Liu | G06F 40/263 |
| 2022/0327309 A1* | 10/2022 | Carlock | G09B 21/009 |
| 2022/0345303 A1* | 10/2022 | Taylor | G06N 3/088 |
| 2023/0140057 A1* | 5/2023 | Samarthyam | G06Q 10/02 705/6 |
| 2024/0256798 A1* | 8/2024 | Cai | H04L 51/04 |

* cited by examiner

INTEGRATED INSTANT MESSAGING SYSTEM WITH BUILT IN TRANSLATION AND METHOD THEREOF

TECHNICAL FIELD

The disclosed invention pertains generally to language translation systems and methods of computer-based online communications. More particularly, embodiments of the discloses an integrated instant messaging system with multiple language translation for chatting between multiple users and a method thereof.

BACKGROUND ART

Instant messaging has become a widely used tool for communicating in real-time over the Internet. Millions of Internet users are using instant messaging applications to chat with friends and family, communicate in chat rooms, and even to exchange pictures or documents. Moreover, several organizations and businesses are integrating instant messaging applications into their repertoire of standard network tools to enhance business communication and replace costly telecommunication services (e.g., telephone and video conferencing). As the Internet's popularity continues to increase around the world, international communication is increasingly common. This means that users will encounter language barriers when using instant messaging.

There are several techniques currently available for addressing such language barriers. In one, a user of an instant messaging tool types a message in their own, or preferred, language into a separate translation program or web site. The user must then activate the translation tool to translate the message into the destination language, and cut and paste the translated text back into the text field of the instant messaging tool. Once this is complete, the user can transmit the message. While this method can be effective, it is obvious that the process of continually cutting, pasting and switching between applications significantly impedes the communication process. Locating good translation tools can also be difficult and distracting for users. And because any one translation tool may not support all language needs a particular user could have, a user may find himself or herself utilizing numerous different tools to chat with different contacts around the world, which also lessens the utility of the messaging service.

In one technique, a dedicated translation tool is integrated with an instant messaging program. These techniques are lacking in flexibility, however, because they tie the messaging program to a single translation tool and do not take advantage of existing translation tools available, many online, some of which are updated frequently and are of a superior quality.

In other techniques, a sort of translation between two languages was only possible by human-trained human intervention or interpretation in both languages. However, this techniques require little additional work on the part of the user, some users may find that they require too much delegation of control to the translator, preventing users from controlling how their messages are translated and from refining the translated messages.

Further, in yet another technique, such as the machine translators generally operate based on statistical/probabilistic analysis of context and grammar, usually without the need for human intervention/interpretation. Typical machine translation is often error prone, especially if the text to be translated has minimal context. Text with minimal context is often found in conversations that employ a concise sentence structure. In addition, machine translation often involves abbreviations, acronyms, contractions, colloquial words/phrases, proper nouns, and common nouns. These are also commonly found in conversational texts.

Another problem with existing automated translation techniques is that most of them require each of the users to utilize the same translation technology in order that both can communicate across a language divide.

Thus, in light of the above-stated discussion, there is an urgent need for a technical solution that overcomes the above-stated limitations. The present disclosure focuses on an integrated instant messaging system with a built-in translation feature for translating messages in a respective language of a chat participant within a messaging environment to remove language barriers in communication and helps strengthen the connection between people around the world.

SUMMARY OF THE DISCLOSURE

The following is a summary description of illustrative embodiments of the invention. It is provided as a preface to assist those skilled in the art to more rapidly assimilate the detailed design discussion which ensues and is not intended in any way to limit the scope of the claims which are appended hereto in order to particularly point out the invention.

According to illustrative embodiments, the present disclosure focuses on an integrated instant messaging system with a built-in translation feature for translating messages in a respective language of a chat participant within a messaging environment.

According to the first aspect of the present disclosure, an integrated instant messaging system with built-in translation feature for translating a plurality of messages in a respective language of a chat participants within a messaging environment comprising a server for encryption and decryption of a public key to facilitate interaction between the chat participants, a translation engine operably coupled with the configured server to automatically translate each of the plurality of messages in the respective language in real time, a database to store user data, a memory having one or more modules, a communication network allowing communication between the server, a user device, a memory and a processor; and a display interface within a messaging application being executed on a user device to present a chat window for conducting a chat. In particular, the messaging application presents the plurality of messages in the respective language in the chat window.

The processor embedded within the user device coupled to the memory unit of the user device to facilitate execution of the instructions to perform operations of presenting, the chat window for conducting the chat by the user with at least one recipient user, sending, the plurality of messages in a user respective language, automatically translating, the each of the plurality of messages to a recipient respective language in real time, receiving, the plurality of messages by the at least one recipient user in a recipient respective language. In particular, the plurality of messages are translated by converting the plurality of messages from chat terms to plain respective language of the chat participants.

In accordance with an embodiment of the present invention, the chat participant is a user(s) and/or recipient user(s).

According to the second aspect of the present disclosure, the translation engine is operably configured with a machine learning model to improve translations by maximizing translation accuracy and translation speed and a natural language processing model to recognize a semantic meaning of words/phrases/sentences to adjust translations of the messages.

In accordance with an embodiment of the present invention, the built-in translation engine is an artificial intelligence based translation engine.

According to the third aspect of the present disclosure, the plurality of messages translated may be any of electronic messages, text messages, contextual messages, voice messages, audio messages, multi-media messages and alike messages.

According to the fourth aspect of the present disclosure, the chat on the user's chat window is displayed in a user's respective language and the chat on the recipient user's chat window is displayed in a recipient user's respective language throughout the chat.

In accordance with an embodiment of the present invention, the messaging application supports multiple chatting sessions independent of the active chat.

According to the fifth aspect of the present disclosure, the server is configured to: send an encrypted translated message to at least one recipient contact and decrypt the encrypted translated message for the at least one recipient contact to read the encrypted translated message in his respective language.

According to the sixth aspect of the present disclosure, a method for translating a plurality of messages in a respective language of a chat participants within a messaging environment by an integrated instant messaging system comprises steps of: registering a user installed on a messaging application installed on a user device 130, presenting, on a messaging application, a chat window for conducting a chat by a user with at least one recipient user; sending, on a chat window, the plurality of messages in a user respective language, automatically translating, by translation engine, the each of the plurality of messages to a recipient respective language in real time; receiving, on the chat window, the plurality of messages by the at least one recipient user in a recipient respective language; displaying, by a display interface, the plurality of messages in the respective language on the user device.

According to the seventh aspect of the present disclosure, the method further comprises a step of automatically encrypting and decrypting a public key to facilitate interaction between the chat participants.

According to the eighth aspect of the present disclosure, the method comprises the steps of receiving a request from the user to browse chat history, stop browsing the chat history and delete the chat history.

The foregoing solutions of the present disclosure are attained an integrated instant messaging system built-in translation feature for translating a plurality of messages and a method thereof.

BRIEF DESCRIPTION OF DRAWINGS

To describe the technical solutions in the embodiments of the present disclosure or in the prior art more clearly, the following briefly describes the accompanying drawings required for describing the embodiments or the prior art. Apparently, the accompanying drawings in the following description merely show some embodiments of the present disclosure, and a person of ordinary skill in the art can derive other implementations from these accompanying drawings without creative efforts. All of the embodiments or the implementations shall fall within the protection scope of the present disclosure.

The integrated instant messaging system is illustrated in the accompanying drawings, which like reference letters indicate corresponding parts in the various figures. It should be noted that the accompanying figure is intended to present illustrations of exemplary embodiments of the present disclosure. This figure is not intended to limit the scope of the present disclosure. It should also be noted that the accompanying figure is not necessarily drawn to scale.

DESCRIPTION OF EMBODIMENTS

Those skilled in the art will be aware that the present disclosure is subject to variations and modifications other than those specifically described. It is to be understood that the present disclosure includes all such variations and modifications. The disclosure also includes all such steps, features, compositions and compounds referred to or indicated in this specification, individually or collectively, and any and all combinations of any or more of such steps or features.

Definitions

For convenience, before further description of the present disclosure, certain terms employed in the specification, and examples are collected here. These definitions should be read in the light of the remainder of the disclosure and understood as by a person of skill in the art. The terms used herein have the meanings recognized and known to those of skill in the art, however, for convenience and completeness, particular terms and their meanings are set forth below.

The articles "a", "an" and "the" are used to refer to one or to more than one (i.e., to at least one) of the grammatical object of the article.

The terms "comprise" and "comprising" are used in the inclusive, open sense, meaning that additional elements may be included. It is not intended to be construed as "consists of only". Throughout this specification, unless the context requires otherwise the word "comprise", and variations such as "comprises" and "comprising", will be understood to imply the inclusion of a stated element or step or group of element or steps but not the exclusion of any other element or step or group of element or steps.

The term "including" is used to mean "including but not limited to". "Including" and "including but not limited to" are used interchangeably.

The term "account address" or "user account" refer to any account on any electronic communication service. An account address can include a user identifier (e.g., a username, handle, alias, number, or the like) and an identifier of the electronic communication service where the user identifier is valid. A single user can have one or more user identifiers across multiple electronic communication services and can have multiple user identifiers on a single service. Accounts or account addresses for a single user on different services might or might not have the same user identifier.

Terms "user" or "chat participant" can be used interchangeably throughout the draft for convenience.

Messaging Application is the software that can be installed onto a device and run on top of the operating system. The application programs are functions that enable a user to do things with a computer/user device. Applications are written in special languages to run under the various operating systems. In a computer environment.

Certain embodiments of the present invention relate to a unified communication application (also referred to as "an integrated instant messaging system") that translates participant's messages to respective language for an electronic communication session.

Various embodiments described herein provide systems and methods translating a plurality of messages in a respective language of a chat participants within a messaging environment in between multiple users, possibly at two or more client systems. Modes of communication facilitated by embodiments include Internet-based chat, email chats, text-based cellular communications and online social media chats. For example, the systems and methods may implement a multilingual multi-user chat system.

Figure 1A:
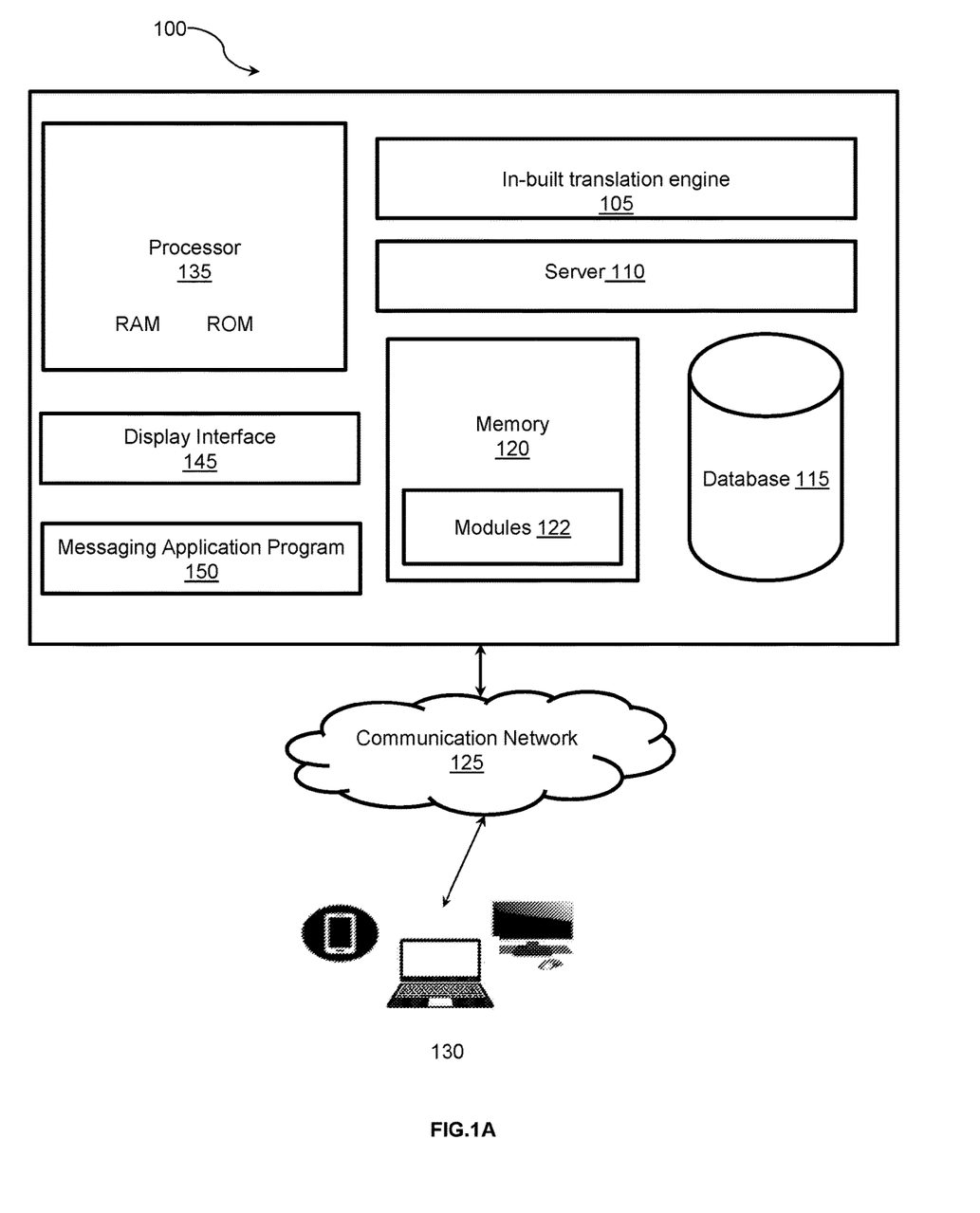
FIG. 1A is a block diagram illustrating an integrated instant messaging system within which various aspects of the present disclosure can be implemented, in accordance with one or more embodiments of the present invention.

FIG. 1A is a block diagram illustrating an integrated instant messaging system 100 with a built-in translation feature within which various aspects of the present disclosure can be implemented, in accordance with one or more embodiments of the present invention. The integrated instant messaging system 100 allows users/chat participants to communicate without any language barriers by providing a built-in translation feature.

The integrated instant messaging system 100 includes a translation engine 105, a server 110, one or more databases ("hereinafter referred as database 115"), a memory 120, a communication network 125, a user device 130, a processor 135, a display interface 145.

The translation engine 105 is operably coupled with the configured server 110 to automatically translate each of the messages in the respective language of the chat participant in real time. The translation engine 105 may be an in-built translation engine.

Further, the translation engine can be any advanced AI-driven translation technologies, such as but not limited to ChatGPT, to automatically translate messages in real time, making conversations faster and more efficient.

In an embodiment the translation engine 105 is configured to convert a translation of the word or phrase from the first language to the second language based on the user's respective language preference.

In an implementation, the translation engine 105 provide a "translation functionality" to translate custom protocols used by the messaging application 150 (e.g., such as may define signals exchanged over channel 120 a) into a universal protocol known as "semantic information interchange language" or "SIIL," also denoted herein a "first protocol." It will be appreciated that this translation effectively standardizes communications between messaging application 150 and the rest of the platform, including server 110, as well as other service modules and applications besides messaging application 150.

The translation engine 105 may in some implementations include selecting a word or phrase from a data store that is associated with a translation failure from a first language to a second language of a message containing the word or phrase, and providing a user about the translation failure.

An aspect of the present invention relates to a computer program for improving language translation through user feedback.

The server 110 is configured to receive one or more signals via the communication network to retrieve data stored thereon. Moreover, the server 110 communicates with the integrated instant messaging system 100, user device 130 and messaging application 150 via the communication network 125. The server 110 may be, but not limited to a cloud server, a remote server, a web server, a software server, a proxy server, a network server, or a server farm, and so forth. Embodiments of the present invention are intended to include or otherwise cover any type of the server, including known, related art, and/or later developed technologies.

In some implementations, the server 110 can communicate via a virtual private network (VPN), Secure Shell (SSH) tunnel, or other secure network connection.

In accordance with an embodiment of the present invention, the database 115 may be configured for storage and retrieval of data associated with the integrated instant messaging system 100. The data may include but is not limited to user data, operating data, instructions data, chat data, usage data, authentication data, user details, user credentials, semantic data, translation data, a query semi-structured data, a chat history data, usage data, and alike data.

In some implementations, the database 115 may further include separate databases such as a user database, a semantic database, a chat database, a language directory database, a translation database, an authentication database, and the like.

In some implementations, database 115 may be a NoSQL database, MongoDB, to store and manage the integrated instant messaging system 100 usage data. Further, MongoDB provides flexibility, scalability, and efficiency to store and query semi-structured data.

In accordance with an embodiment of the present invention, the memory 120 stores one or more modules (hereinafter referred as modules 122) that may execute any set of instructions directly as computer executable codes or indirectly (such as scripts). In that regard, the terms "instructions," and "steps" may be used interchangeably herein. The module 122 includes but is not limited to user registration module 205, data collection module 210, data processing module 215, and notification module 220 (explained more in detail in FIG. 2). The instructions may be stored in object code form for direct processing by the processor 135, or in any other computer language including scripts or collections of independent source code modules that are interpreted on demand or compiled in advance.

In accordance with an embodiment of the present invention, the communication network 125 allows communication between the user device 130 and the cloud server 110. In particular, the communication may be through any communication network 125, such as, but not limited to, the Internet, wireless networks, local area networks, wide area networks, private networks, a cellular communication network, or a combination thereof connecting any number of mobile clients, fixed clients, and servers and so forth.

Examples of communication network 125 may include the Internet, a WIFI connection, a Bluetooth connection, a Zigbee connection, a communication network, a wireless communication network, a 3G communication network, a 4G communication network, a 5G communication network, a USB connection, or any combination thereof. For example, the communication may be based through a radio-frequency transceiver (not shown). In addition, short-range communication may occur, such as using Bluetooth, Wi-Fi, or other such transceivers.

In accordance with an embodiment of the present invention, the communication network 125 is a centralized blockchain network or a decentralized blockchain network.

In some implementations, the integrated instant messaging system 100 may be a distributed client/server system that spans one or more communication networks (not shown).

In other implementations, the communication network 125 may further include a corporate network and one or more wireless access points.

The user device 130 to present a chat window for conducting a chat within the messaging application 150 installed thereon. Example of user device 130 can include a desktop computer, a laptop computer, a user computer, a tablet computer, a personal digital assistant (PDA), a cellular telephone, a communication network appliance, a camera, a smartphone, an enhanced general packet radio service (EGPRS) mobile phone, a media player, a navigation device, an email device, a game console, or a combination of any these data processing devices or other data processing devices. Furthermore, the user device 130 can be provided access to and/or receive software software executed and/or stored on any of the cloud server 110.

In some examples, user device 130 performs functions of a social communication network (not shown) to the cloud server 110. In some implementations, the user device 130 can communicate wirelessly through a communication interface, which may include digital signal processing circuitry where necessary.

In some examples, user device 130 is a wireless device, which may be any suitable message initiator, transmits a text message, an SMS message, an instant message or an MMS message or the like (collectively referred to as message or text message).

In an exemplary example, the messaging application 150 includes processor-executable instructions, stored in a computer-readable storage medium and executed by a processor of a user device (mentioned below), for facilitating chat between the chat participants. The messaging application 150 supports multiple chatting sessions independent of the active chat.

Display interface 145 allows the users to connect to and communicate within a messaging application 150 of the one or more user device 130. In some implementations, the Display interface 145 can include a various image generation technologies (e.g., a cathode ray tube (CRT), liquid crystal display (LCD), light-emitting diode (LED) including organic light-emitting diodes (OLED), projection system, or the like), together with supporting electronics (e.g., digital-to-analog or analog-to-digital converters, signal processors, or the like), indicator lights, speakers, headphone jacks, printers, and so on. Some embodiments can include a device such as a touchscreen that functions as both input and output device.

The processor 135 and a computer-readable media 137 having computer-executable instructions stored thereon that are executable by the processor 135 to perform steps of registering a user on the messaging application 150 installed on the user device 130 to perform steps of presenting, on a messaging application 150, a chat window for conducting a chat by a user with a recipient user, sending, on a chat window, the messages in a user respective language, automatically translating, by translation engine 105, the message to a recipient respective language in real time, receiving, on the chat window, the messages by the recipient user in a recipient respective language, and displaying, by a display interface 145, the messages in the respective language on the user device 130.

Processor 135 can include a single processor, which can have one or more cores, or multiple processors. In some embodiments, processor 135 can include a general-purpose primary processor as well as one or more special-purpose co-processors such as graphics processors, digital signal processors, or the like. In some embodiments, some or all processor 135 can be implemented using customized circuits, such as application specific integrated circuits (ASICs) or field programmable gate arrays (FPGAs). In Some embodiments, such integrated circuits execute instructions that are stored on the circuit itself. In other embodiments, processor 135 can execute instructions stored in storage subsystem 110, In accordance with one embodiment of the present invention, the processor 135 is any well-known processor, but not limited to processors from Intel Corporation. Alternatively in another embodiment, the processor 135 is a dedicated controller.

In accordance with yet another embodiment of the present invention, processor 135 may be ARM, MIPS, SPARC, or INTEL® IA-32 microcontroller or the like. Similarly, in yet another embodiment of the present invention, the processor 135 comprises a collection of processing units which may or may not operate in parallel.

In accordance with yet another embodiment of the present invention, the processor 135 which may be any processor-driven device, such as may include one or more microprocessors and memories or other computer-readable media operable for storing and executing computer-executable instructions. As used herein, the term "computer-readable medium" may describe any form of computer memory or memory device, such as, but not limited to, a random access memory ("RAM") or a non-volatile memory, such as a hard disk, memory card, ROM, RAM, DVD, CD-ROM, USB Flash drive, write-capable, and read-only memories an EPROM, or an EEPROM.

Examples of processor-driven devices may include, but are not limited to, a server computer, a mainframe computer, one or more networked computers, a desktop computer, a personal computer, an software-specific circuit, a microcontroller, a minicomputer, or any other processor-based device.

In accordance with an embodiment of the present invention, the integrated instant messaging system 100 may also include one or more input/output ("I/O") ports (e.g., serial ports, (e.g., RS233 port, USB, etc.) (not shown) and one or more network interfaces. The I/O port or ports may be operable to communicate with input/output devices, such as an internal and/or external display, keypad, mouse, pointing device, control panel, touch screen display, another computer-based device, printer, remote control, microphone, speaker, etc., which facilitates user interaction with the system.

Figure 1B:
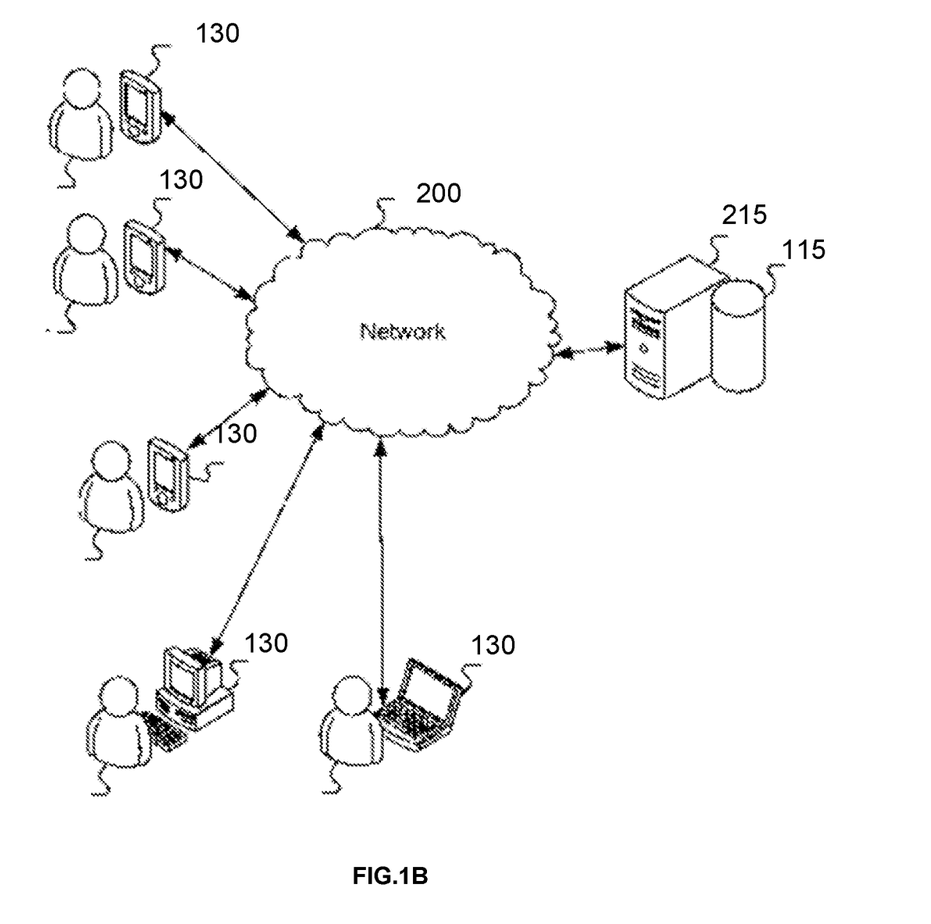
FIG. 1B depicts an exemplary integrated instant messaging system that can be used in implementations of the present disclosure in accordance with an embodiment of the present invention.

FIG. 1B depicts an exemplary integrated instant messaging system 200 that can be used in implementations of the present disclosure. The integrated instant messaging system 200 includes a plurality of user devices 130 each of the user devices being associated with one of the users. The integrated instant messaging system 200 also includes the communication network 125, and server 110. The user devices 130 and the server 110 can communicate with each other through the communication network 125. Server 110 can include one or more computing devices 215 (e.g., one or more servers) and one or more computer-readable storage devices (e.g., one or more databases 115). The user devices 130 can be provided access to and/or receive application software executed and/or stored on any of the other computing systems.

Figure 1C:
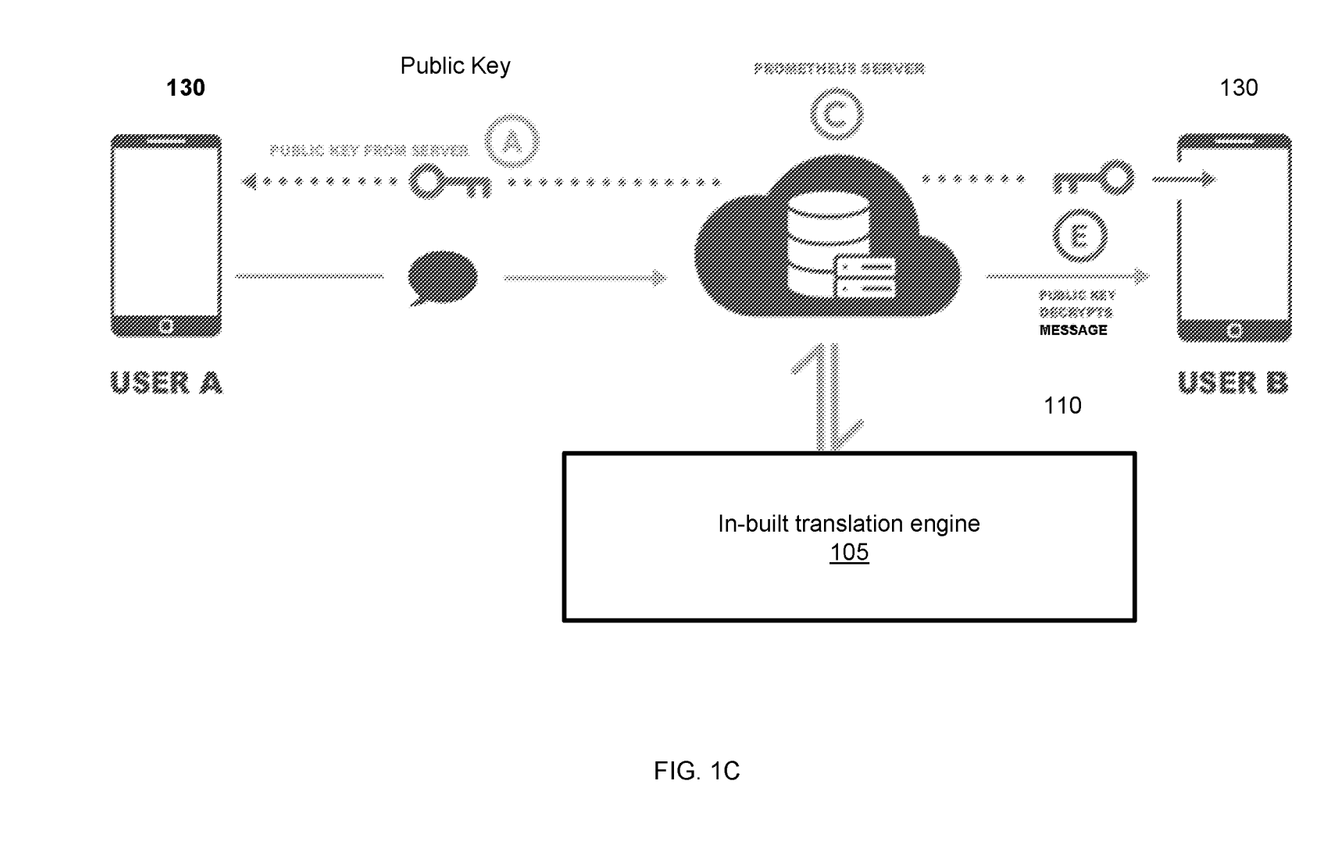
FIG. 1C is a schematic diagram illustrating translation of messages in an integrated instant messaging system according to an implementation of the present invention.

FIG. 1C is a schematic diagram illustrating translation of messages in an integrated instant messaging system according to an implementation of the present invention. The server is configured to send a public key to a user facilitating interaction between the chat participants. When the user sends the messages a secure encryption is automatically applied by the public key to the messages before sending to the server 110. The server automatically decrypts the messages and forwards them to the translation engine 105. Then the translated messages are automatically encrypted by the server 110 before sending to the recipient user. The messages are automatically decrypted on the recipient user device.

In accordance with an embodiment of the present invention, the messages translated may be but not limited to electronic messages, text messages, contextual messages, voice messages, audio messages, multi-media messages and the like messages.

Figure 2:
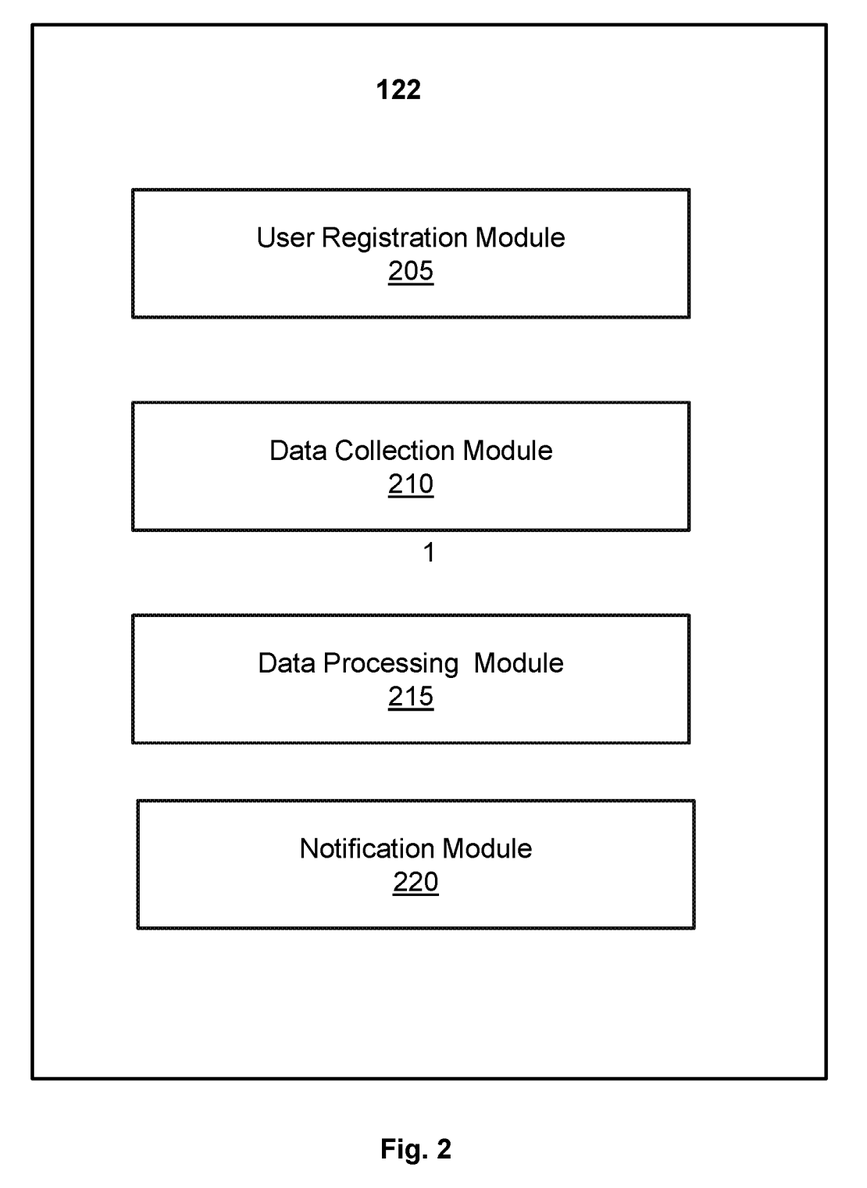
FIG. 2 is a block diagram illustrating a schematic configuration of the modules in accordance with an embodiment of the present invention.

FIG. 2 is a block diagram illustrating a schematic configuration of the modules 122 in accordance with an embodiment of the present invention. In particular, the modules include user registration module 205, data collection module 210, data processing module 215, and notification module 220.

In accordance with an embodiment of the present invention, the user registration module 205 is configured to enable the user to register into the integrated instant messaging system 100 through the messaging application 150 installed on the user device 130. To login on the messaging application 150, the user registers on the user registration module 205 using an email & a password. The user details like mobile number and email address is verified by sending a 4 digit numeric OTP. After successful verification of the OTP the user profile is created, and the user is registered. The registered user signs in into the system using his credentials. The registered user resets the password by adding a valid email ID, receiving an email with a link on the registered email, creating a new password and login with a new password. Further, the user provides a plurality of data fields information including Name of the User, Location of the user, Phone number, Email id, pool manufacturer, model, preferred time and day for weekly water maintenance, delivery address, water quantity of the spa and similar information.

Typically, in order to initiate a chat, a user can log into an integrated instant messaging system using a username and a password. After the user logs into the integrated instant messaging system, the user can view a contacts list that shows the status of the user's established contacts on that service. When the user desires to establish a communication session with a particular contact on the user's contacts list, the user can select an identifier representing the particular contact, or the intended recipient, from the user's contacts list, create a message in a message box that appears when the user selects the identifier, and send the message to the recipient. Upon receiving the message, the recipient can either respond to the sender or decline to respond. If the recipient responds to the sender, a communication session is established and communication between the sender and the recipient (referred to as "participants of the communication session") begins. In some instances, the participants of the communication session can invite other contacts to join the communication session.

In accordance with an embodiment of the present invention, the data collection module 210 is operably configured with the database 115 to collect data such as user data, operating data, instructions data, chat data, usage data, authentication data, user details, user credentials, semantic data, translation data, a query semi-structured data, a chat history data, usage data, and alike data. Additionally, the data collection module 210 also collects usage of the app, languages used, how often the translation feature is used, frequently translated languages, most often translated words and phrases.

The data processing module 215 processes the data retrieved by the data collection module 210 from the database 115 to improve the integrated instant messaging system's performance and translation accuracy, to add new languages in the language directory.

In accordance with an embodiment of the present invention, the notification module 220 is further configured to send notifications (eg, in-chat messages, push notifications, such as pop-up messages) to the user device 130.

Figure 3:
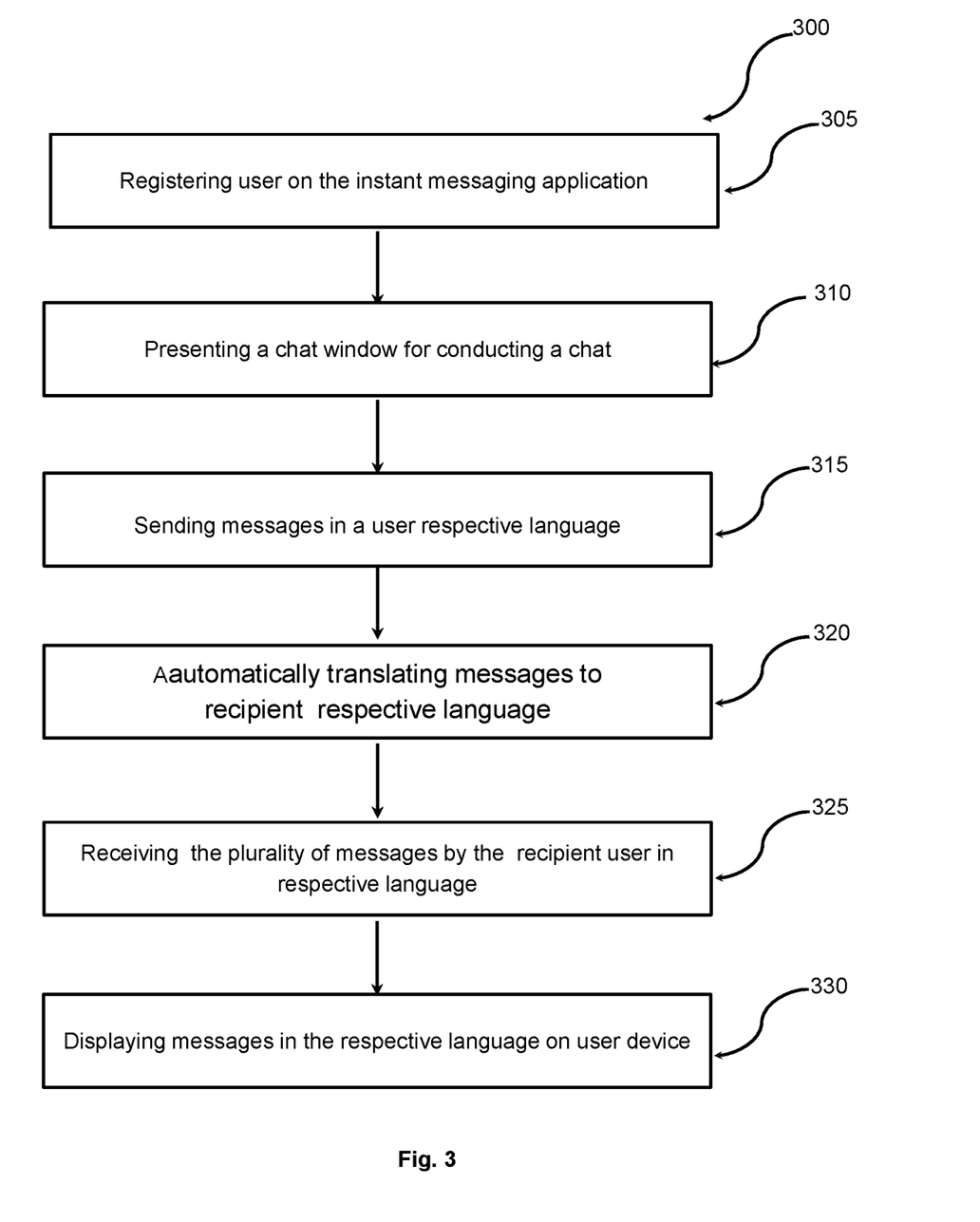
FIG. 3 is a flow chart illustrating a method for translating messages in a respective language of a chat participants within a messaging environment in accordance with an embodiment of the present invention.

FIG. 3 is a flow chart illustrating a method for translating a plurality of messages in a respective language of a chat participant within a messaging environment by an integrated instant messaging system in accordance with an embodiment of the present invention.

At step 310, a chat window is presented on a messaging application for conducting a chat by a user with at least one recipient user.

At step 305, a public key is sent by the server 110 to a user for facilitating interaction between the chat participant.

At step 310, a public key is sent to the chat participant for facilitating interaction between the chat participants on a messaging application (150).

At step 315, when the user sends the message the public key automatically encrypts the message and sends the encrypted message to the server 110.

At step 320, the server 110 automatically decrypts the encrypted message and forward to translation engine 105 for translating into the recipient respective language At step 325, each of the plurality of messages are automatically translated by the translation engine 105 to a recipient's respective language in real time. In particular, the plurality of messages are translated by converting the plurality of messages from chat terms to plain language of the chat participant's respective language.

At step 330, an encrypted translated message is sent to at least one recipient contact on the user device (130). The encrypted translated message is automatically decrypted by the user device for the recipient.

At step 335, the plurality of messages are displayed in the respective language on a display interface of the user device In accordance with an embodiment of the present invention, the method comprises a step of automatically encrypting and decrypting a public key to facilitate interaction between the chat participants.

Figure 4:
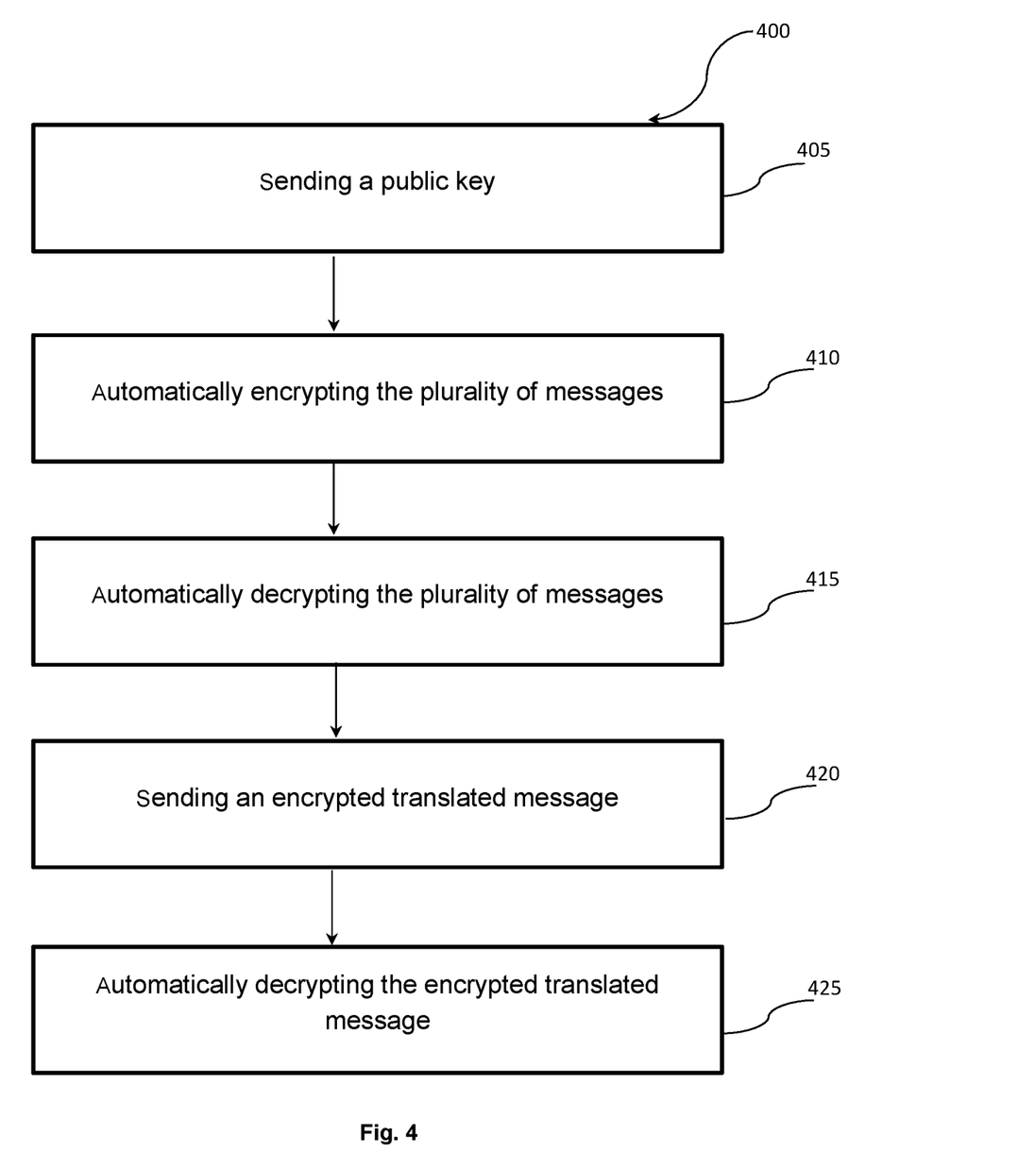
FIG. 4 is a flow chart illustrating a method to translate messages within a messaging environment in accordance with an embodiment of the present invention.

FIG. 4 is a flow chart illustrating a method to translate messages by the server within a messaging environment in accordance with an embodiment of the present invention. Method 400 starts at step 405 and proceeds to step 410.

The method starts at step 405. At step 405, user registers on the messaging application 150 installed on a user device 130.

At step 410, initiating a chat interaction, on a messaging application (150) installed on a user device (130) by the chat participants in respective language.

At step 415, the plurality of messages are sent on a chat window in a user's respective language At step 420, the plurality of messages are received on the chat window by the recipient user in the recipient's respective language.

In accordance with an embodiment of the present invention, the method performed by the translation engine within a messaging environment comprises steps of improving translations by a machine learning model to maximize translation accuracy and translation speed and recognizing a semantic meaning of words/phrases/sentences by a natural language processing model to adjust translations of the messages.

In accordance with an embodiment of the present invention, the method displays a chat history of the user in a user's respective language and the chat history of the recipient user in a recipient user's respective language throughout the chat.

In accordance with an embodiment of the present invention, the method includes a step of receiving a request from the user to browse chat history, stop browsing the chat history and delete the chat history.

Figure 5A:
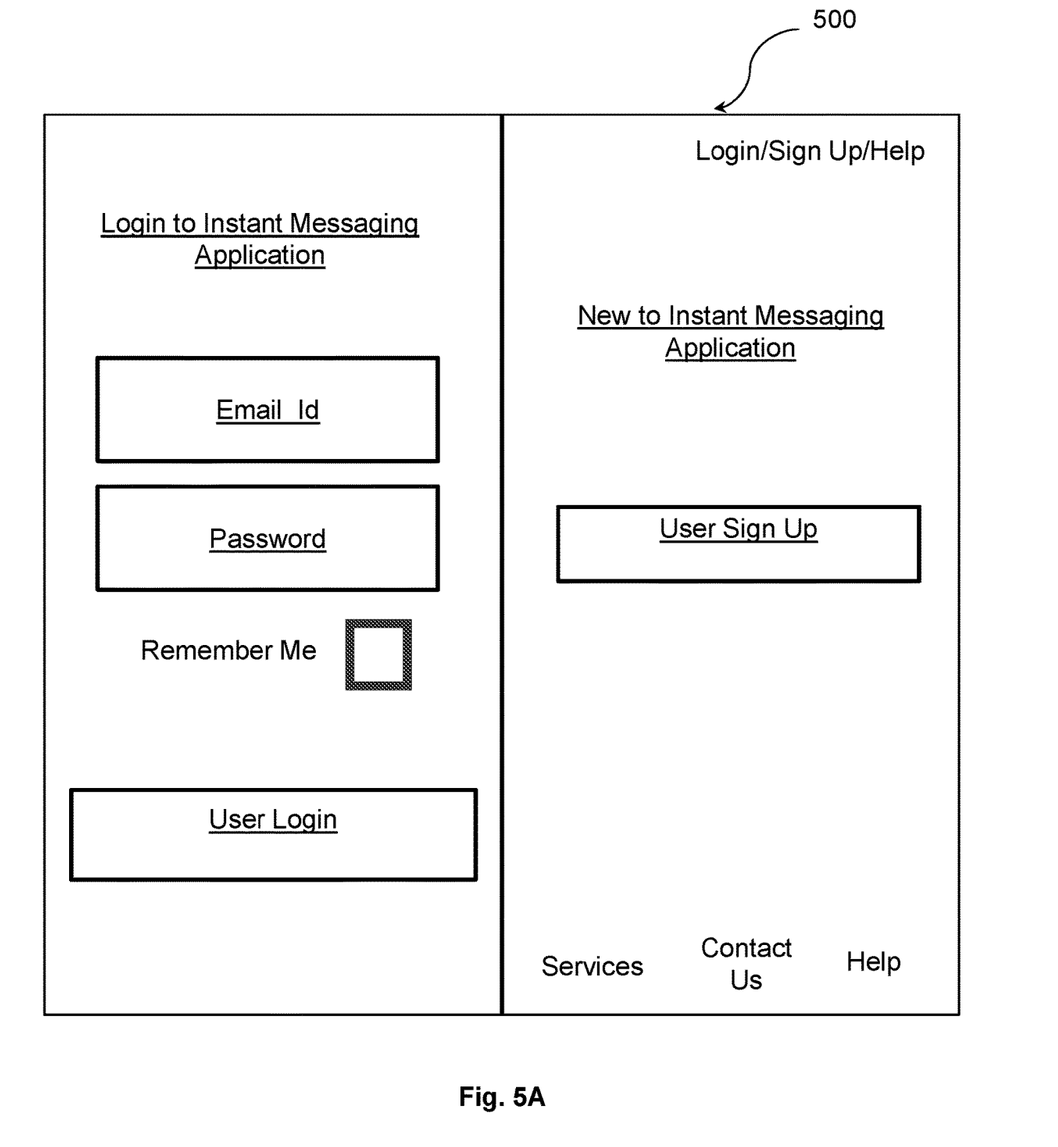
FIG. 5A illustrates an exemplary display interface of the messaging application in accordance with an embodiment of the present invention.
Figure 5B:
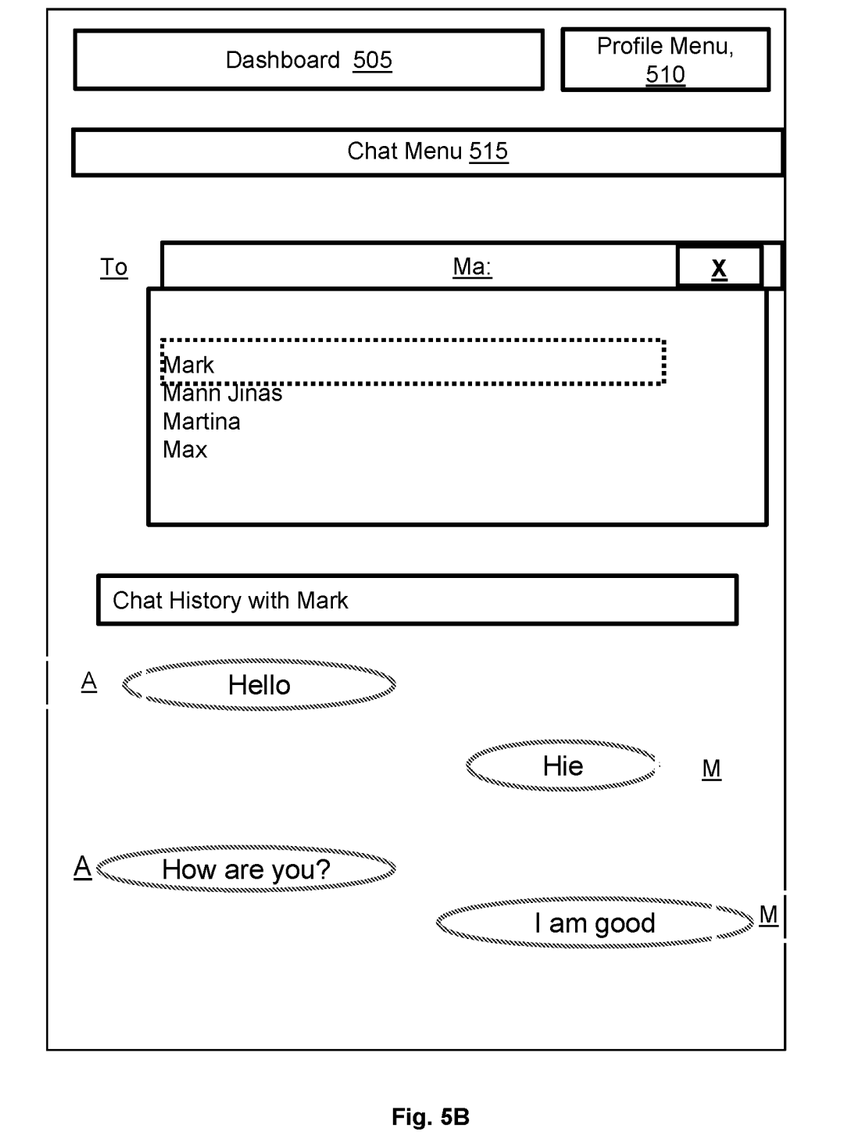
FIG. 5B illustrates an exemplary display interface of the messaging application in accordance with an embodiment of the present invention.

The method may further include updating a translation or translation of the word or phrase from the first language to the second language based on the user feedback FIG. 5A and FIG. 5B illustrates an exemplary interface of the messaging application 150 in accordance with an embodiment of the present invention. To login, the user enters the user credentials including an email & a password which he used at the time on user registration. The messaging application 150 validates the credentials. On successful validation, the user logs into the messaging application 150. After logging into messaging application 150 the user views the dashboard interface 505 with one or more dashboard items: a profile menu 510, a chat menu 515, a chat window 520 and alike menu on the user device 130. The dashboard interface 505 sends push notifications to the user. Further, the user may disable the dashboard interface 505 to stop sending and receiving push notifications.

The profile menu 510 further comprises the user information, the plurality of data fields including a Profile Image, Name of the User, Location of the user, Phone number, Email id, and alike information.

Figure 5C:
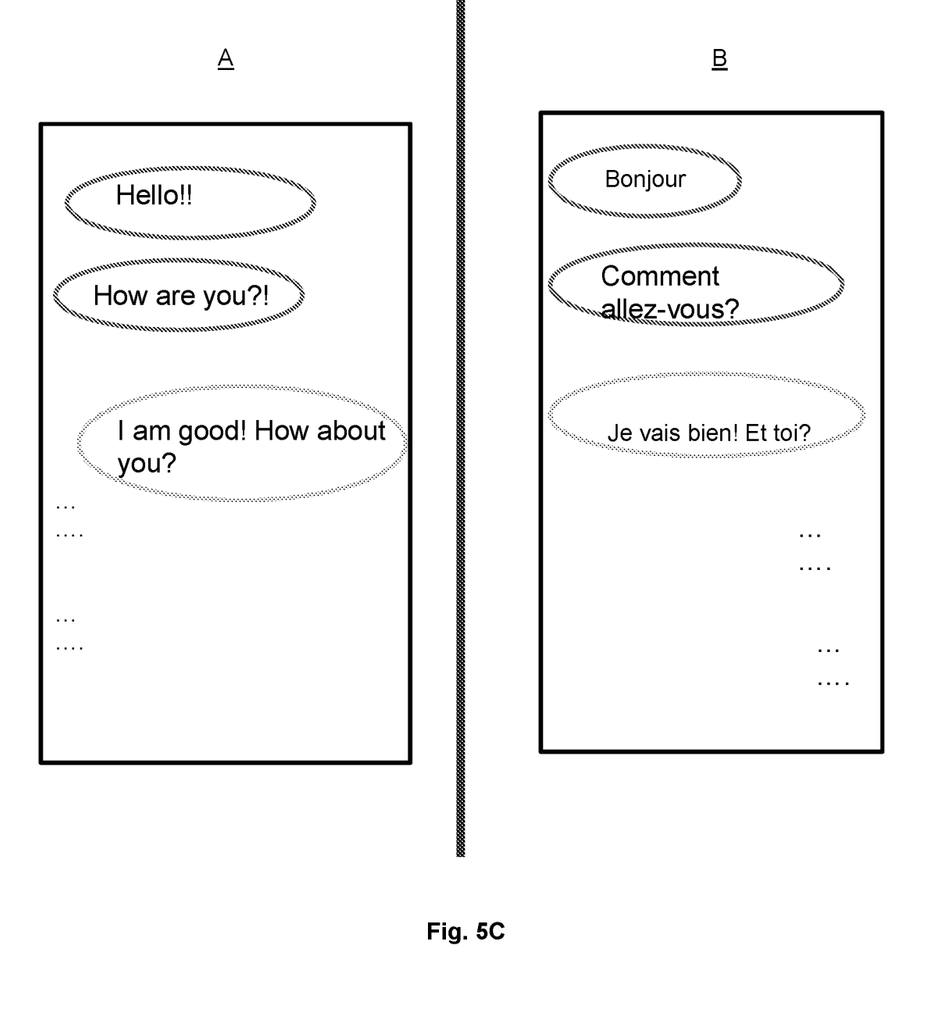
FIG. 5C illustrates an exemplary chat window of the messaging application in accordance with an embodiment of the present invention.

FIG. 5C illustrates an exemplary chat window of the messaging application in accordance with an embodiment of the present invention. Once the user logins into the messaging application 150 the user selects preferred language. The user searches for friends or contacts using the messaging application 150 or adds contacts manually. The user starts a chat with a contact by typing a message in his preferred language. The message is automatically translated into the recipient's preferred language by the built-in AI translation engine 105. The recipient receives the message in his preferred language. Further, the built-in AI translation engine 105 automatically translates recipient's response into the sender's preferred language.

In an exemplary example, user A is a English speaker chatting with user B a French on the integrated instant messaging system 100:

User A: "Hello, how are you?"

Once User A sends the message, the translation engine 105 will automatically translate it into French and User B views the message in French on his chat window.

User A: "Salut, comment ça va?"

User B answers in French

User B: "Salut, ça va bien, et toi?"

Again, the translation engine 105 will automatically translate it into English and User A views the message in English on his chat window.

User B: "Hello, I'm fine, and you?"

The chat of the user is displayed in a user's respective language on his chat window and the chat history of the recipient user is displayed in a recipient user's respective language on his chat window throughout the chat providing a seamless communication to both.

In accordance with an embodiment of the present invention, the user can view the chat history at any time and deletes individual messages or the entire history.

In accordance with an embodiment of the present invention, the user can also change the preferred language.

Implementation Details

One embodiment is based on the following high level requirements:
  1) The software shall be configured as a cross-platform and run on the following platforms at a minimum: iOS Android Advantageously, the automatic translations of messages in real time into the recipient's language allows users to have faster, more efficient conversations by reducing the risk of errors and misunderstandings The integrated instant messaging system relies on secure and tested encryption technology to ensure that messages cannot be read by unauthorized third parties on their way from the sender to the recipient.

A person of ordinary skill in the art may be aware that, in combination with the examples described in the embodiments disclosed in this specification, units and algorithm steps may be implemented by electronic hardware, computer software, or a combination thereof.

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical software, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the software or implementation without departing from the spirit or scope of the claims of the present technology.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

In a case that no conflict occurs, the embodiments in the present disclosure and the features in the embodiments may be mutually combined. The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. An integrated instant messaging system with a built-in translation feature for translating a plurality of messages in a respective language of a chat participants within a messaging environment comprising:
    a server for sending a public key to facilitate interaction between the chat participants;
    a translation engine operably coupled with the server to automatically translate each of the plurality of messages in the respective language in real time;
    a database configured with the server to store a plurality of data;
    a memory having one or more modules including user registration module, data collection module, data processing module, payment module and notification module;
    a communication network allowing communication between the server, a user device, the memory and a processor;
    a display interface within a messaging application being executed on the user device to present a chat window for conducting a chat; the messaging application presents the plurality of messages in the respective language in the chat window;
    a processor embedded within the user device coupled to a memory unit of the user device to facilitate execution of instructions to perform operations comprising:
        automatically encrypting, by the public key, the plurality of messages of the chat participants;
        automatically decrypting the plurality of messages of the chat participants;
        automatically translating the each of the plurality of messages to a recipient respective language in real time;
        sending an encrypted translated message to at least one recipient contact; and
        automatically decrypting the encrypted translated message by the user device;
        displaying the plurality of messages in the recipient respective language on the user device, wherein the plurality of messages are translated by converting the plurality of messages from chat terms to plain respective language of the chat participants;
        selecting, from a data store, at least one word or phrase associated with a translation failure from a sender respective language to the recipient respective language of the translated message including the at least one word or phrase;
        outputting, to the user device, information about the translation failure of the at least one word or phrase included in the translated message; and
        updating, based on user feedback via the user device, the display of the plurality of messages in the recipient respective language on the user device.

2. The integrated instant messaging system (100) as claimed in claim 1, wherein the translation engine is operably configured with:
    a machine learning model to improve translations by maximizing translation accuracy and translation speed; and
    a natural language processing model to recognize a semantic meaning of words/phrases/sentences to adjust translations of the messages.

3. The integrated instant messaging system as claimed in claim 2, wherein the translation engine is a built in artificial intelligence translation engine.

4. The integrated instant messaging system as claimed in claim 1, wherein the plurality of data includes semantic data, translation data, a query semi-structured data, a chat history data, usage data, user data, operating data, instructions data, chat data, usage data, payment data, authentication data, user details, user credentials, semantic data, translation data, a query semi-structured data, a chat history data, or usage data.

5. The integrated instant messaging system as claimed in claim 1, wherein the plurality of messages translated may be anyone of electronic messages, text messages, contextual messages, voice messages, audio messages, multi-media messages and alike messages.

6. The integrated instant messaging system as claimed in claim 1, the chat participant is a user, a sender and/or recipient user.

7. The integrated instant messaging system (100) as claimed in claim 6, wherein the chat window of the sender displays chat in a sender's respective language and the chat window of the recipient user displays in a recipient user's respective language.

8. The integrated instant messaging system as claimed in claim 1, wherein the messaging application supports multiple chatting sessions independent of the active chat.

9. The integrated instant messaging system as claimed in claim 1, wherein the processor performs steps of:
    registering chat participants on the messaging application installed on the user device;
    initiating a chat interaction, on the messaging application installed on the user device by a sender in the respective language; and
    receiving, on the chat window, the plurality of messages by the at least one recipient user in a recipient respective language.

10. A method for translating a plurality of messages in a respective language of a chat participants within a messaging environment by an integrated instant messaging system wherein the method comprises steps of:
    presenting, on a messaging application, a chat window for conducting a chat by the chat participants with at least one recipient user;
    sending, by a server, a public key to the chat participants for facilitating interaction between the chat participants on the messaging application;
    automatically encrypting, by the public key, the plurality of messages of the chat participants;
    automatically decrypting, by the server, the plurality of messages of the chat participants;
    automatically translating, by a translation engine, each of the plurality of messages to a recipient respective language in real time;
    automatically decrypting, by the user device, the encrypted translated message;
    displaying, by a display interface, the plurality of messages in the recipient respective language on the user device, wherein translating the plurality of message comprises converting the plurality of messages from chat terms to plain language of the chat participants;

selecting, from a data store, at least one word or phrase associated with a translation failure from a sender respective language to the recipient respective language of the translated message including the at least one word or phrase;

outputting, to the user device, information about the translation failure of the at least one word or phrase included in the translated message; and updating, based on user feedback via the user device, the display of the plurality of messages in the respective language on the user device.

11. The method as claimed in claim 10, wherein the method further comprises a step of automatically encrypting and decrypting the public key to facilitate interaction between the chat participants.

12. The method as claimed in claim 10, wherein the method comprises steps of:

registering the chat participants on the messaging application installed on the user device;

initiating a chat interaction, on the messaging application installed on the user device by a sender in the respective language; and receiving, on the chat window, the plurality of messages by the at least one recipient user in a recipient respective language;

wherein the messaging application-(150) supports multiple chatting sessions independent of the active chat.

13. The method as claimed in claim 10, wherein the method performed by the translation engine comprises steps of:

translating by a machine learning model by maximizing translation accuracy and translation speed; and recognizing, by a natural language processing model, a semantic meaning of words/phrases/sentences to adjust translations of the messages, wherein the translation engine is an artificial intelligence translation engine.

14. The method as claimed in claim 10, wherein the plurality of messages translated may be anyone of electronic messages, text messages, contextual messages, voice messages, audio messages, multi-media messages and alike messages.

15. The method as claimed in claim 10, the chat participant is any user, the sender and/or recipient user.

16. The method as claimed in claim 15, wherein the chat window of the sender displays chat in a sender's respective language and the chat window of the recipient user displays in a recipient user's respective language.

17. The method as claimed in claim 10, wherein the method comprises receiving a request from the chat participant to perform an action selected from browsing chat history, closing chat history and deleting chat history.

\* \* \* \* \*